Oct. 17, 1967 SHINTARO OSHIMA ETAL 3,348,061

PARAMETRON ELEMENT USING CONDUCTIVE WIRE WITH FERRO-MAGNETIC THIN-FILM DEPOSITED THEREON

Filed Aug. 13, 1963 3 Sheets-Sheet 1

PARAMETRON ELEMENT USING CONDUCTIVE WIRE WITH FERRO-MAGNETIC THIN-FILM DEPOSITED THEREON

Filed Aug. 13, 1963

United States Patent Office 3,348,061
Patented Oct. 17, 1967

3,348,061
PARAMETRON ELEMENT USING CONDUCTIVE WIRE WITH FERRO-MAGNETIC THIN-FILM DEPOSITED THEREON

Shintaro Oshima, Higashi-machi, Musashino-shi, Tetsusaburo Kamibayashi, Kitaadachi-gun, Saitama-ken, and Keigo Komuro, Toshima-ku, Tokyo-to, Japan, assignors to Kokusai Denshin Denwa Kabushiki Kaisha (also known as Kokusai Denshin Denwa Co., Ltd.), Tokyo-to, Japan, a joint-stock company of Japan Filed Aug. 13, 1963, Ser. No. 301,758
Claims priority, application Japan, Aug. 18, 1962, 37/34,153
1 Claim. (Cl. 307—88)

ABSTRACT OF THE DISCLOSURE

A parametron element operable at a high frequency range, in which the resonance circuit is composed of two parallel disposed linear conductors the terminals of which are directly connected at one end and connected through a tuning capacitor at the other end, and having exciting means composed of a looped band conductor arranged orthogonally to the linear conductors. Each of the conductors has a ferromagnetic film extending circumferentially and longitudinally thereof.

This invention relates to a parametron element using conductive wire with ferro-magnetic thin-film deposited thereon and more particularly to a parametron element having non-linear members which are excited by a magnetic field orthogonal to the lengthwise direction of the conductive wire.

A parametron element, utilizing the non-linearity of a ferro-magnetic substance, is provided with a resonance circuit composed of non-linear inductive members and capacitive tuning means. An exciting terminal means is provided for applying, into said resonance circuit, a D.C. bias current and an exciting current signal which has a frequency equal to twice the resonance frequency of said resonance circuit. An input means applies an off number of input information signal or signals into said resonance circuit, and output terminal means are provided for deriving, from said resonance circuit, an output current which has a frequency equal to one half the frequency of the exciting current and taking one of two phase positions mutually having a phase difference of $\pi$ relative to each other in accordance with the polarity or polarities of said input information signal or signals.

A conventional parametron element or logical element usually includes ring cores or a thin film core or cores, windings wound on the core for forming the resonance circuit and for applying excitation signals to the resonance circuit, and, further, an input transformer for applying input information signal or signals to the resonance circuit. In order to obtain parametron elements operable with low power consumption, it is desirable that the size of said core be small. However, in the conventional parametron elements associated with said windings, the winding work thereof becomes increasely difficult with miniaturization of the core size. Accordingly, the conventional parametron elements have disadvantages such as limitations in miniaturization of size, difficulty of obtaining low power consumption and difficulty of mass-production due to necessity of winding work on the cores.

An essential object of this invention is to provide a parametron element having none of the above-mentioned disadvantages and having advantages such as ease of miniaturization, low power consumption, high operation speed, wide range of operable temperature, high reliability, long life, and especially ease of mass-production due to unnecessity of winding work on the cores.

Said object can be accomplished by a parametron element according to this invention, which is characterized in that the resonance circuit is composed of at least one linear conductor with a ferro-magnetic thin film deposited thereon and a tuning capacitor connected with the terminals of the linear conductor, and exciting means composed of a winding which has at least one turn and is wound on the linear conductor so as to be substantially orthogonal to the lengthwise direction of the linear conductor.

The invention, both as to its construction and operation, together with further advantages thereof, may best be understood by reference to the following description, taken in connection with the accompanying drawings, in which.

Figure 3A:
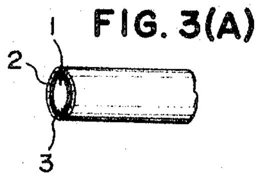
Figure 3B:
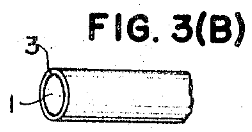
Figure 10A:
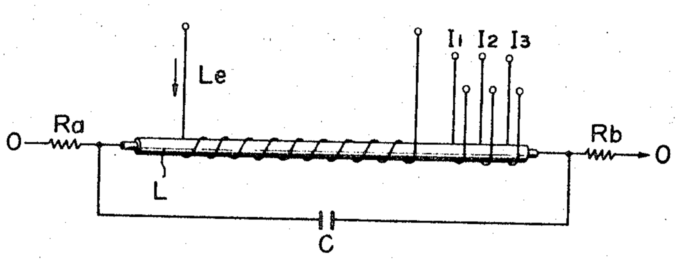
Figure 10B:
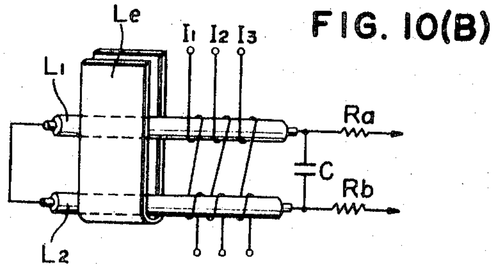
Figure 10C:
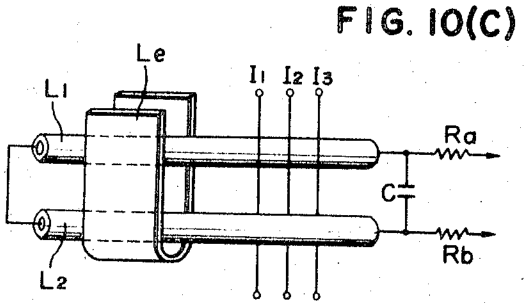

FIGS. 3(A) and 3(B) are fragmentary perspective views of wire material to be employed as a non-linear inductive member of parametron elements according to this invention;

FIGS. 4(A), 4(B), 4(C), 5(A), 5(B), 6(A), 6(B), 6(C), 6(D), 7, 8 and 9 respectively show embodiments of this invention;

FIG. 10(A) is a schematic diagram for describing the principle of input means of a parametron element according to this invention; and FIGS. 10(B) and 10(C) are schematic diagrams for describing examples of input means of the parametron elements according to this invention.

Figure 1:
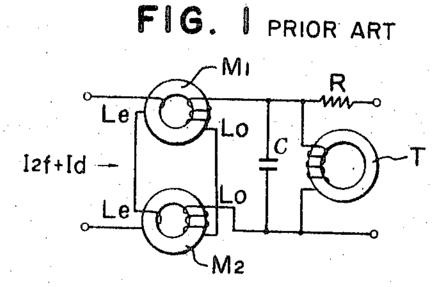
FIG. 1 PRIOR ART
FIG. 1 is a schematic diagram showing a conventional parametron element.

Conventional parametron elements are generally composed, as shown in FIG. 1, of two cores $M_1$ and $M_2$ each of which has a thickness of approximately 1 millimeter and an outside diameter of about two to four millimeters, an exciting winding $L_e$ which has coils wound, respectively, on the cores $M_1$ and $M_2$ and has one to several number of turns, an oscillation winding $L_0$ having a plural number of turns, and a tuning capacitor C. In this case, an A.C. exciting signal $I_{2f}$ and a D.C. bias current signal $I_d$ are applied to the exciting winding, whereby an output signal having a frequency equal to one half the frequency of the exciting signal is derived from the oscillation winding; where T is an input transformer and R is a coupling resistance. The parametron element according to this invention developed for eliminating the disadvantages of conventional parametron elements mentioned above will be described below.

Figure 2:
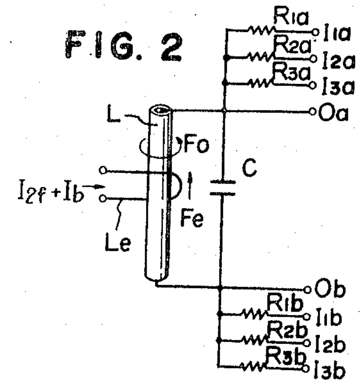
FIG. 2 is a schematic diagram of a parametron element for describing the principle of this invention.

FIG. 2 shows a schematic diagram of the parametron element according to this invention. This element includes a resonance circuit, an exciting means, input terminal means and output terminal means. The resonance circuit is composed of a non-linear inductive member L, such as is shown in FIGS. 3(A) and 3(B) described below, and a tuning capacitor C which is connected with the terminals of the inductive member L. The exciting means is composed of a winding $L_e$ which has at least one turn and is wound on the linear inductive member L so as to be substantially orthogonal to the lengthwise direction of the linear inductive member L. Input terminal means and output terminal means are provided at the terminals of the tuning condenser C which are identical to the terminals of the inductive member L. In this FIG. 2, three input information signals are respectively applied to terminals ($I_{1a}$, $I_{1b}$), ($I_{2a}$, $I_{2b}$), and ($I_{3a}$, $I_{3b}$). Accordingly, an information obtained as the result of the decision by majority with respect to the three input information signals is applied to the resonance circuit. With reference to the number of input information signals, however, it is possible to select any odd number thereof including one. An output signal is derived through output terminals $O_a$ and $O_b$ which are provided at the connection terminals between the inductive member L and the tuning condenser C. Coupling resistances $R_{1a}$, $R_{1b}$, $R_{2a}$, $R_{2b}$, $R_{3a}$, and $R_{3b}$ are, respectively, inserted per said input terminal in order to prevent direct coupling between the parametron elements; therefore, said coupling resistors can be inserted at the output terminal side with the same function and effect. In another embodiment, only one pair of coupling resistances are shown as being employed, as a pair, for deriving the output signal through a balanced wire system. In an unbalanced conductor system, one coupling resistance may be inserted in each pair of input or output terminals. A different coupling system without coupling resistances will be described in a later paragraph. As shown in FIG. 2, the directions of the exciting magnetic field $H_e$ and the oscillation magnetic field $H_o$ are orthogonal to each other. Therefore, the exciting circuit and the resonance circuit are not directly coupled to each other while the inductive member L is still excited by the exciting signal.

Next, inductive members of parametron elements according to this invention will be described.

As shown in FIG. 3(A), the inductive members of the parametron element according to the present invention are composed of a conductive line 1, an insulative layer 2 and a ferro-magnetic thin-film 3 deposited on the layer 2, but they have the unique feature wherein a non-linear material, such as a ferro-magnetic substance, can be deposited directly on an ordinary conductive wire without insulation material between said conductive wire and the deposited material. The insulation material 2 covers the outer side of this wire conductive material as shown in FIG. 3(B), where 1 is an ordinary conductive wire material, and 3 is a non-linear material, such as a ferromagnetic substance. For the reason of this formation, the greater parts of the exciting current and the oscillation current of the parametron element flow into the conductive wire 3, which has a lower impedance than the material 3. Accordingly, the excitation is carried out with low power consumption. Moreover, since the thin film of material 3 is directly deposited on the conductive wire 1 so as to cover it, the greater part of magnetic fluxes of the exciting current pass through said thin film, whereby the magnitude of inductance per unit length of inductive member becomes larger that than of conventional parametron element.

In general, a parametron element oscillates when the condition: $\Gamma Q \geqq 1$ is satisfied, where $\Gamma$ is a parametric excitation factor, and Q corresponds to the Q of the resonant circuit in the parametron element. More particularly, the parametric excitation factor $\Gamma$ is substantially defined by the following equation:

$$L_p = L_{po}(1 + 2\Gamma \sin 2\omega t)$$

where $L_p$ is the inductance of the oscillation winding in the state excited by the excitation signal, $L_{po}$ is a constant inductance of the oscillation winding which is not varied by the excitation signal, and $2\omega$ is the angular frequency of the excitation signal. In other words, the parametric excitation factor is substantially defined as the ratio of the variable component $\Delta L$, in the inductance of oscillation winding caused by the excitation current, to the constant inductance $L_{po}$.

According to the formation of the inductive member of this invention described above, the value of said parametric excitation factor $\Gamma$ becomes larger than that of the conventional parametron element. Said increase of the value of factor $\Gamma$ is greater than the decrease of said Q caused by the flowing of a part of excitation current into the thin film, therefore satisfying the aforesaid oscillation condition.

This feature based on said formation of the inductive member has a desirable advantage in that the inductive members of the parametron element can be easily mass-produced by utilizing the technique of electroplating or evaporative deposition because of the non-existence of insulation material. Furthermore, since the non-linear material is deposited directly onto the conductive wire of the exciting circuit and of the oscillation circuit of this element, excitation is accomplished with low excitation power, and maximum output current can be obtained. As mentioned above, in the parametron element of this invention it is not necessary to wind wires on a core or cores. This is an important advantage of this invention.

Moreover, said ferro-magnetic inductive members have high value of Curie temperature of approximately 600° C. Accordingly, the parametron elements of this invention have a very wide operable temperature range.

Figure 4A:
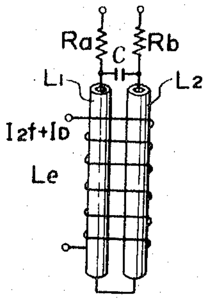
Figure 4B:
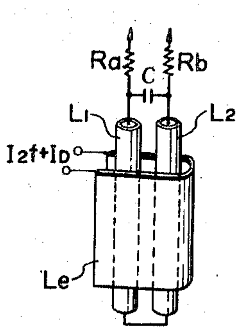
Figure 4C:
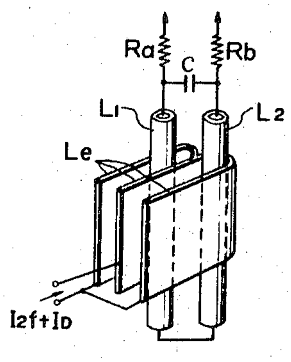

FIGS. 4(A), 4(B), and 4(C) show embodiments of this invention wherein two inductive members $L_1$ and $L_2$ are employed as inductive members, terminals on one side of the inductive members $L_1$ and $L_2$ are connected directly, and the terminals on the other side thereof are connected through insertion of a tuning capacitor C. Said inductive members $L_1$ and $L_2$ and the tuning capacitor C form the resonance circuit. The exciting means of these elements are arranged in different formations although they accomplish the same purpose of excitation. The exciting means of FIG. 4(A) is composed of a winding having a plural number of turns; the exciting means of FIG. 4(B) is composed of a loop of a conductive band $L_e$ which surrounds concurrently around said two linear inductive members $L_1$ and $L_2$; and the exciting means of FIG. 4(C) is composed of a loop of a conductive band $L_e$ which surrounds separately around said linear inductive members $L_1$ and $L_2$. By the employment of such an exciting winding as a band type, excitation by an excitation signal of high frequency can be easily accomplished because the impedance of the exciting winding $L_e$ is small.

Figure 5A:
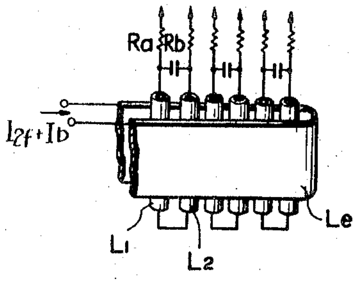
Figure 5B:
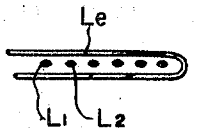
Figure 6A:
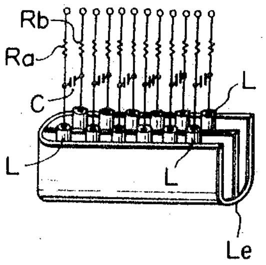
Figure 6B:
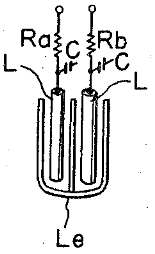
Figure 6C:
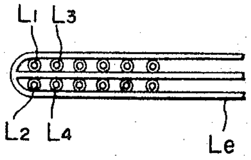
Figure 6D:
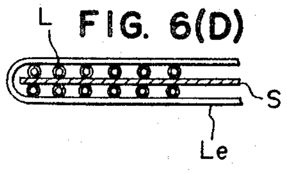

According to the simple construction of said exciting winding, a plurality of parametron elements can be formed into a very simple type applicable to mass-production. FIG. 5 shows one example for forming a plurality of parametron elements which are excited by only one band loop. FIG. 5(A) shows a schematical illustration of said type and FIG. 5(B) shows the sectional view thereof cut by a plane perpendicular to the inductive members. Actually, these elements can be arranged on and fixed to a substratum or substrata arranged oppositely to each other. In this case, when said exciting winding $L_e$ of band type is formed by the use of the printing technique on a substratum, these elements can be embodied more easily. Especially when a thin, flexible substratum is employed and folded so as to encompass said inductive members, these parametron elements can be formed into a very thin type.

FIG. 6 shows the case wherein parametron elements are formed on both sides of a substratum or of a center exciting conductor. The center exciting conductor is the same as that shown in FIG. 4(C). The sectional views illustrated in FIGS. 6(C) and 6(D) respectively correspond to the case of center conductor and of substratums. In this case, a pair of inductive members can be formed in any combination, such as ($L_1$, $L_2$) and ($L_3$, $L_4$) or ($L_1$, $L_4$) and ($L_2$, $L_3$).

Figure 7A:
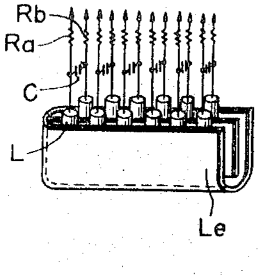
Figure 7B:
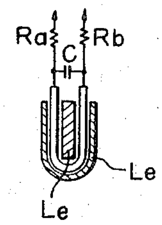

FIG. 7 shows another formation of a plurality of parametron elements, in which a continuous inductive member L bent at the center portion thereof is adopted for each inductive member. In this embodiment, it is not necessary to connect two inductive members in each parametron element.

Figure 8:
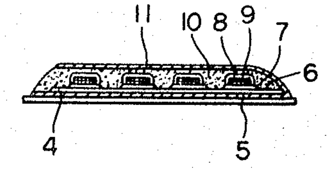

FIG. 8 shows a sectional view of another formation of a plurality of parametron elements which are produced by the use of the technique of evaporative deposition. This embodiment is constructed by the laminated deposition on the substratum 4. More particularly, a conductive layer 5 of band type, an insulative layer 6 of plane type, ferromagnetic thin-film 7 of line type, conductive layers 8 of line type, ferro-magnetic thin-films 9 of line type, an insulative layer 10 of plane type, and a conductive layer 11 of plane type are successively deposited on the substratum 4.

Figure 9:
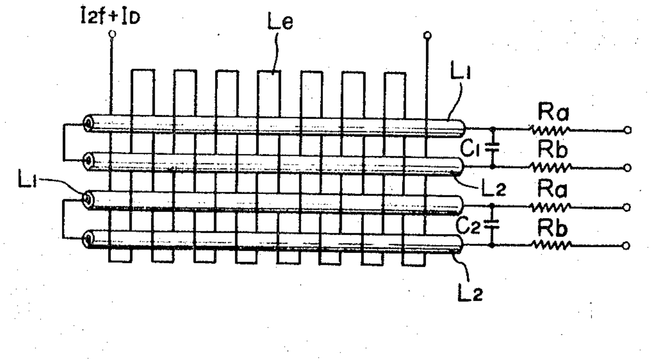

FIG. 9 shows yet another embodiment in which the inductive members $L_1$ and $L_2$ and winding $L_e$ of the exciting means are woven into a fabric. Since this formation of the parametron element can be produced by mass-production, by utilizing a conventional weaving machine, any size of fabric-type parametron elements can be easily formed.

In the above-mentioned embodiment, coupling resistance $R_a$ and $R_b$ are used as coupling means for applying information signals to the resonance circuit and for deriving output signals therefrom. Instead of the coupling resistances, coupling wires can be employed as the coupling means. One example of this type is shown in FIG. 10(A), in which $I_1$, $I_2$, and $I_3$ are input coupling wires. However, this system shown in FIG. 10(A) has a disadvantage such as induction of the excitation signal into the coupling wire circuit. In order to avoid this defect, actual coupling wires are provided as shown in FIGS. 10(B) and 10(C). The coupling wires of FIG. 10(B) are wound respectively on the inductive members $L_1$ and $L_2$ so as to be coupled oppositely to each other. The coupling wires of FIG. 10(C) are arranged closely to and orthogonally to the inductive members so as to be coupled also in opposite directions. By the use of the above-mentioned coupling system, each parametron element can be coupled without direct connection.

As described above, parametron elements according to the present invention have many advantages, especially, of simple construction and of high operation speed. More particularly, as a result of increase of excitation efficiency obtained from the direct deposition of ferro-magnetic thin-film onto the wire conductor of the oscillation (resonance) circuit, and because of the ease of applying high frequency excitation signals, the parametron element according to the present invention readily generates a very high frequency output signal of over 100 megacycles, thereby being capable of obtaining a high clock frequency of over 1000 kilocycles. The power consumption of each element is also very low, being lower than 10 milliwatts. Moreover, since a perpendicular magnetic field produced by the direct current bias signal is applied to the inductive members, the hysteresis characteristic of the ferro-magnetic thin-film can be established in any form of loop curve, such as a rectangular loop curve or a parallelogram loop curve.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What we claim is:

A parametron element comprising a resonant circuit composed of two linear conductors disposed parallel and each having a ferromagnetic thin film deposited thereon and a tuning capacitor, terminals on said two linear conductors at one end of each conductor directly connected to each other, terminals on the other end of each conductor connected to each other through said tuning capacitor, exciting means to apply to said resonant circuit an exciting signal current having a frequency twice the resonant frequency of said resonant circuit and a bias current and comprising a band conductor loop wound concurrently on said two linear conductors so as to be orthogonal to the lengthwise direction of the linear conductors, input means coupled to the resonant circuit to apply thereto an odd number of input information signals, and output means for deriving from the resonant circuit an output current having a frequency equal to one half the frequency of the exciting current and assuming one of two possible phase positions which differ by 180° from each other.

References Cited

UNITED STATES PATENTS

| | | | |
|---|---|---|---|
| 2,998,840 | 9/1961 | Davis | 307—88 |
| 3,275,839 | 9/1966 | Bartik | 307—88 |

TERRELL W. FEARS, *Primary Examiner.*